March 5, 1946.  G. A. WAHLMARK  2,395,946

MECHANISM FOR ACTUATING MACHINE TOOL SUPPORTS

Filed July 5, 1941  3 Sheets-Sheet 3

INVENTOR.
Gunnar A. Wahlmark,
BY
his Atty.

Patented Mar. 5, 1946

2,395,946

UNITED STATES PATENT OFFICE 2,395,946

MECHANISM FOR ACTUATING MACHINE TOOL SUPPORTS

Gunnar A. Wahlmark, Rockford, Ill., assignor to Sundstrand Machine Tool Co., Rockford, Ill., a corporation of Illinois Application July 5, 1941, Serial No. 401,280

19 Claims. (Cl. 60—53)

This invention relates more particularly to a mechanism for reciprocating a machine tool support at feed and traverse rates, it being the general object of the invention to provide a new and improved mechanism of that character.

A more particular object of the invention is the provision of mechanism of the character described having improved construction facilitating the fast and smooth stopping, reversing or reduction in the rate of movement of a machine tool support driven by the mechanism.

Another object is to provide an improved mechanism of the character described which reduces the stresses heretofore incident to stopping, reversing or reducing the rate of movement of a machine tool support driven by the mechanism.

Another object is to provide driving mechanism for a machine tool support including a motor and means operable to make available the full mechanical advantage of the motor for stopping, reversing or reducing the rate of movement of the support.

A further object is to provide mechanism including a pump and a variable stroke motor connected in a closed circuit, and means, responsive to the back pressure built up as an incident to stopping, reversing or reducing the rate of movement of a support driven by the mechanism, shifting the motor to maximum stroke to make available automatically the full mechanical advantage of the motor.

Other objects and advantages will become apparent from the following detailed description taken in connection with the accompanying drawings, in which.

While there is illustrated in the drawings and will hereinafter be described in detail a preferred embodiment of the invention, it is to be understood that the invention is not limited to the particular embodiment and arrangement shown. On the contrary, it is contemplated that various changes may be made by those skilled in the art without departing from the spirit and scope of the invention as defined in the appended claims.

The form of the mechanism selected for purposes of disclosing the invention is basically that shown and described in my copending application for Mechanisms for actuating machine tool supports, Serial No. 350,475, filed August 3, 1940, since issued as Letters Patent No. 2,344,432, dated March 14th, 1944. Reference is therefore made to that application for a more complete disclosure, particularly details of mechanical construction of a mechanism in which the present invention is embodied.

Figures 1, 2:
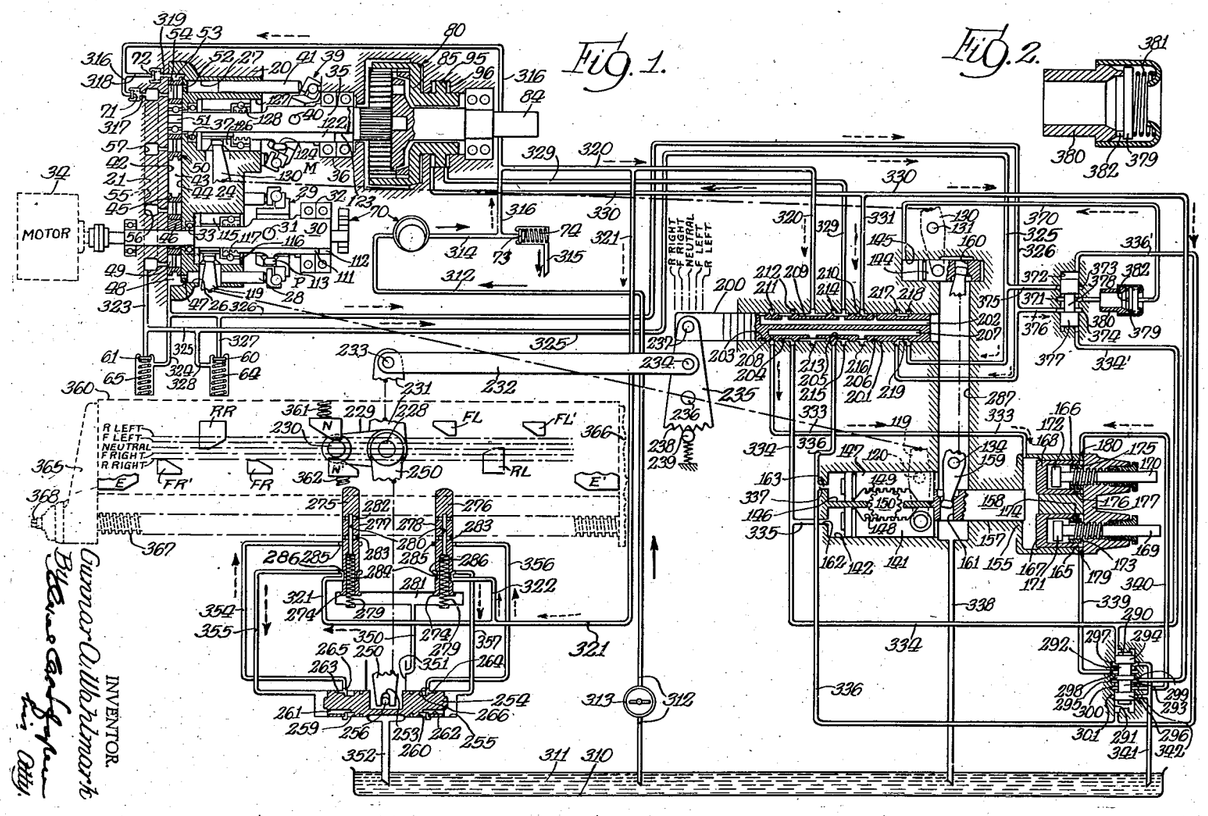
Fig. 1 of the drawings is a diagrammatic view of a mechanism embodying the features of this invention.
Fig. 2 is an enlarged view of the check valve rotated 90° from the position shown in Fig. 1.

This mechanism includes a fluid transmission comprising a casing 20 having a detachable end member 21. The lower portion of the casing is occupied by a pump P and the upper portion by a motor M. A single cylinder block 24 is secured in the casing and has an annular series of pump cylinders 26 and an annular series of motor cylinders 27 formed therein. Pistons 28 in the pump cylinders are arranged to be actuated by means of a wobbler device 29 which is pivotally mounted on a drive shaft 30 by means of a pin 31. As illustrated in Fig. 1, the wobbler 29 is shown in a neutral position, the wobbler being adjustable angularly in both directions from the neutral position to provide for reversing the flow of fluid from the pump, as well as adjusting the output volume of the pump. The shaft 30 is rotatably mounted in the casing and in the cylinder block in bearings 32 and 33, respectively, and projects outwardly through the end member 21 of the casing for connection to a suitable electric motor 34 or other prime mover.

A shaft 35 for the motor M is rotatably mounted in the casing and the cylinder block by means of bearings 36 and 37, respectively. This shaft carries a wobbler device 39 which is pivotally mounted on the shaft by means of a pin 40, so that the wobbler may be adjusted angularly on the shaft to vary the stroke of the motor pistons 41.

The inner surface 42 of the end member 21 is preferably flat and forms one wall of a valve chamber 43, in which the valves of both the pump and the motor operate. The cylinder block 24 is recessed as illustrated to provide an opposed flat surface 44 forming the opposite wall of the valve chamber. Operable in the lower portion of the valve chamber 43 and to control the flow of fluid to and from the pump cylinders 26 is a wheel-like valve 45 of the type more fully disclosed and claimed in my prior Patent No. 2,190,812, dated February 20, 1940. This valve is mounted on an eccentric 46 on the shaft 30 and is operable to connect the pump cylinder ports 47 alternately to the peripheral portion 48 of the valve chamber and to the inner portion 49. Operable in the upper portion of the valve chamber 43 is a wheel-like valve 50 for the motor. This valve is mounted on an eccentric pin 51 on the motor shaft 35 and is operable during rotation of the shaft to connect the motor piston ports 52 alternately to the peripheral portion 53 of the valve chamber and the inner portion 54 thereof. As will be apparent from the drawings, the provision of a common valve chamber for the pump and valves provides a direct connection for the flow of fluid from the pump to the motor (or vice versa) through the narrow midportion of the valve chamber. A second passage for the flow of fluid between the pump and the motor is provided in the end member 21 to 55, this passage having an annular portion 56 in the lower part of the end member communicating with the inner portion 49 of the valve chamber and having an annular portion 57 in the upper part of the end member communicating with the inner portion 54 of the valve chamber.

A pair of high pressure relief valves 60 and 61 are provided to limit the pressures in the passages between the pump and motor. These valves are normally held seated by means of coiled springs 64 and 65. The connection between these high pressure relief valves and the passages between the pump and the motor will be more fully described in connection with the description of the circuit.

Preferably, a rotary pump 70 is mounted on the casing 20 and driven from the right hand end of the pump shaft 30. The pump 70, as illustrated, is of the form shown in my prior Patent No. 2,132,813, dated October 11, 1938, and serves to supply fluid at approximately 150 pounds per square inch pressure to the pump-motor circuit to maintain this circuit full at all times and for actuating control mechanisms. Cooperating with the pump 70 to maintain the pump-motor circuit full of fluid are a pair of check valves 71 and 72, the operation of which, as well as the flow of fluid from the pump 70, will be described in greater particularity hereinafter. Preferably, a relief valve 73 is backed by a spring 74 which may be adjusted so that the valve 73 opens on pressures in excess of 150 pounds per square inch. This valve is connected in the output circuit of the pump 70 to limit the pressure of the make-up and control fluid.

In actuating a table for a milling machine, it is desirable to obtain a plurality of relatively slow feed speeds and also a relatively high or rapid traverse speed. While the pump P and motor M combine to provide a large number of different speeds of the motor shaft 35, an additional means is provided for utilizing these motor shaft speeds for obtaining traverse movements of the table and for reducing these speeds still further to obtain feed movements. To that end, the transmission includes a planetary gearing, generally designated 80, operatively interposed between the motor shaft 35 and a driven shaft 84 in alignment with the motor shaft. This gearing may take any one of a number of well known forms and preferably is of the character disclosed in detail in my above mentioned Patent No. 2,344,432. Suffice it to say that the gearing has a shiftable element 85 which in one position causes the planetary gearing to operate as a unit, and in another position causes the gearing to operate to drive the shaft 84 at a speed below that of the shaft 85. The element 85 is shifted to its various positions by means of a piston 95 reciprocably mounted in a cylinder 96.

The control mechanism for the wobbler device of the pump and motor will now be described. The pump wobbler device 29 is adjustable by means including a member 111 slidable in a keyway 112 extending longitudinally in the pump shaft 30. The member 111 has a radially extending portion 113 engaging in a radial opening in the wobbler device so that movement of the member 111 toward the left from the position shown in the drawing pivots the wobbler device in a clockwise direction to cause a flow of fluid from the pump to the motor, operating the motor in a forward (table) direction, whereas, movement of the member toward the right rotates the wobbler device in a counterclockwise direction, causing a reverse flow of fluid from the pump to the motor and a reversal of the motor and table movement. A tubular control member 115 for the pump is slidably mounted in a bore 116 in the cylinder block 24 and is connected with the member 111 by means of a ball bearing 117. The control member 115 has a radial bore therein, and into this bore extends one end of a lever 119 pivotally mounted intermediate its ends on a pin 120. The motor wobbler device 39 has a similar slidable control member 122 positioned in a keyway 123 in the motor shaft 35 and provided with an outwardly extending arm 124 which engages in a bore in the wobbler device. A tubular control member 126 is slidable in a bore 127 in the cylinder block 24 and is connected to the member 122 by means of a ball bearing 128. The tubular member 126 has a radially extending bore which receives one end of a lever 130 pivotally mounted intermediate its ends on a pin 131.

In the form illustrated herein, the pump control lever 119 and the motor control lever 130 are arranged to be operated by piston and cylinder devices, and, furthermore, are arranged to have their operative positions determined by additional piston and cylinder devices. Thus, the remaining end of the lever 119 extends into a diametrical bore in a piston 141 which is slidably mounted in a cylinder 142. The remaining end of the lever 130 extends into a diametrical bore in a piston 144 slidably mounted in a cylinder 145. Arranged immediately adjacent and parallel to the cylinder 142 is a cylinder 146 containing a piston 147, the pistons 141 and 147 having cutaway portions provided with rack teeth 148 and 149, respectively, which mesh with a pinion 150 rotatably mounted. This geared connection between the pistons 141 and 147 permits actuation of the lever 119 by the piston 147, as well as by the piston 141.

An auxiliary casing 155 supported by the main casing 20 has a cylindrical bore 157 therein positioned parallel to but midway between the axes of the pistons 141 and 147. A cylindrical plunger 158 is slidably mounted in the bore 157 and at its left hand end projects into the paths of the right hand ends of the pistons 141 and 147. The plunger 158 is connected to the piston 144 by means of a lever 159 which is pivoted intermediate its ends on a pin 134. The upper end of the lever 159 enters a bore 160 in the piston 144, whereas, the lower end of the lever enters a bore 161 in the plunger 158. The piston 144 has a slightly smaller pressure area than either of the pistons 141 or 147, so that when the piston 144 and one of the pistons 141 or 147 are subjected to the same fluid pressure the piston 141 or 147 will control. The connections just described are such that, by supplying fluid to the cylinder 142 through a port 162, the piston 141 will be moved toward the right and will cause a swinging movement of the pump control lever 119 in a counterclockwise direction, thus causing a movement of the tubular control member 115 toward the left and an adjustment of the wobbler device 29 in a clockwise direction about the pivot 31. If fluid is supplied to the cylinder 146 through a port 163, the rack and pinion connection will cause a movement of the piston 141 toward the left, thus causing an adjustment of the wobbler device 29 in a counterclockwise direction from that shown in Fig. 1. Regardless of whether the piston 141 moves to the right or the piston 147 moves to the right, the plunger 158 will be moved to the right and, through the intervening lever 159, piston 144, and lever 130, will cause an adjustment of the motor control member 126 toward the right from the position shown in Fig. 1, so as to reduce the stroke of the motor pistons as the stroke of the pump pistons is increased. Since the movement of the motor wobbler device 39 is always in the same direction from a neutral position, the direction of rotation of the motor shaft will be reversed when the fluid flow from the pump is reversed.

The extent to which the pump and motor wobbler devices are pivoted by action of the pistons 141 and 147 is determined by additional piston and cylinder devices mounted in the casing 155. In this casing are arranged parallel cylinders 165 and 166 having pistons 167 and 168 therein, respectively. These pistons are hollow and have extending into their open or right hand ends screw devices 169 and 170, respectively, which are provided with heads 171 and 172. A ring 173 is screw-threaded into the piston 167 and secured there by means of a pin 174 so that the movement of the piston 167 toward the left is determined by engagement of the ring 173 with the head 171 of the screw device 169. A similar ring 175 is screw-threaded into the piston 168 and secured thereto by a pin 176 so that the movement of the piston 168 toward the left is limited by engagement of the ring 175 with the head 172 of the screw device 170. The screw devices 169 and 170 are threaded through a cap member 177 secured to the casing 155 by suitable means. As described more fully hereinafter, fluid may be supplied to the right hand end of the cylinder 165 through a port 179 or to the cylinder 166 through a port 180 to maintain the corresponding piston in its left hand position as determined by its associated screw device. The pistons 167 and 168, therefore, are operable to limit the movement of the plunger 158 toward the right and thereby operate to limit the movement of the wobbler devices and to determine the operative positions thereof.

Movements of the various control piston and cylinder devices are herein shown to be controlled by means including a main valve 200 cylindrical in form and slidably mounted in a bore 201. This valve has five positions, a central neutral position and feed and traverse positions on each side of neutral, the feed and traverse positions to the left of the neutral position being arranged to effect movement of the table toward the right, and the positions to the right of neutral being arranged to effect movement of the table toward the left. The valve 200 has a longitudinally extending port 202 therein which communicates with annular recesses 203, 204, 205 and 206 in the periphery of the valve. The port 202 extends all the way to the right hand end of the valve so as to discharge into the valve bore which in turn discharges into a return line to the tank as hereinafter more fully described. The valve also has a longitudinally extending port 207, closed at both ends, which communicates with annular recesses 208, 209 and 210 in the periphery of the valve. The valve bore 201 is provided with annular grooves 211, 212, 213, 214, 215, 216, 217, and 218, the function of which will become more readily apparent from the description of the circuit hereinafter.

In its preferred form, the invention includes means for automatically shifting the valve 200 in order to obtain an automatic cycle of operation of the table. This means includes a control unit arranged to be mounted on the bed of a milling machine immediately in front of the table. A shaft 228 is rotatably mounted in the housing of the unit and has at its outer end an arm 229 adapted to be moved to and between five different positions corresponding to the five positions of the valve 200. The arm 229 carries a spring pressed plunger 230 located in a position where it may be engaged by various dogs secured to the front edge of the table, as hereinafter more fully described. On its inner end the shaft 228 carries an arm 231 which is arranged to be connected to the valve 200 by means of linkage consisting of a link 232 secured at one end to the arm 231 by a pin 233 and secured at its other end by a pin 234 to the midportion of an arm 235 pivotally mounted on a stud 236. The free end of the arm 235 is pivotally connected to the valve 200 by means of a pin 237. Preferably the arm 235 is provided with five notches 238 in which a spring pressed ball 239 is engageable to form a detent device adapted to hold the valve 200 releasably in its different operative positions. These connections between the shaft 228 and the valve 200 cause the valve to assume its different positions corresponding to the positions of the arm 239.

Although the arm 229 may be actuated directly by dogs on the table when the valve 200 is to be shifted from a feed or traverse position to neutral or from the feed position on one side of the neutral to the traverse position on the same side of neutral (or vice versa), the invention provides additional means for shifting the valve 200 through its neutral position in order to reverse the table. Thus, the shaft 228 has a downwardly extending arm 250 secured thereto. The lower end of this arm is slotted at 253 and enters a recess in the midportion of a cylindrical plunger or piston 254 which is slidably mounted in a cylinder bore 255 in the housing of the control unit. The piston 254 carries a pin 256 which passes through the slot 253 in the arm 250 so that the shaft 228 may be rocked by movement of the piston 254 in the cylinder bore 255. The piston is provided with annular grooves 259 and 260 and with longitudinal ports 261 and 262 extending between the grooves 259 and 260, respectively, and the opposite ends of the piston. The piston is also provided with longitudinally extending peripheral recesses 263 and 264 which extend outwardly from the grooves 259 and 260, respectively, but stop short of the ends of the piston. The cylinder bore 255 is provided with annular grooves 265 and 266 which cooperate with the piston 254 in a manner more fully described hereinafter.

It is contemplated that the piston 254 will normally be maintained in hydraulic balance so that it will remain in any position to which it may be moved when the shaft 228 is rotated by means of the arm 229 and a table dog engaging the plunger 230 on said arm. Since the piston 254 is normally maintained in hydraulic balance the shaft 228 may also be moved to any one of its five annular positions by means including a manual control handle (not shown). Means is provided to unbalance the piston 254 and to move it in one direction or another to an extreme position when the table is to be reversed. As illustrated herein this means includes a pair of cylindrical valves 275 and 276 slidably mounted in horizontal bores 277 and 278, respectively, in the control unit housing. These valves have portion projecting outwardly from the housing toward the table and have flanges 274 on their inner ends to limit outward movement of the valves in the housing. Coiled springs 279 are provided to maintain the valves 275 and 276 in their extended positions. Each one of these valves has a longitudinally extending axial port 280 which communicates at the inner end of the valve with a chamber 281 in the housing. Each valve has annular recesses 282 and 283 which communicate with the port 280, and a wide annular recess 284. The bores in which the valves are mounted have annular grooves 285 and 286. The valves 275 and 276 are arranged to be actuated by "end" or "reversing" dogs on the table and function to control the unbalancing of the piston 254 hydraulically as hereinafter more fully described.

In addition to the parts already described, the hydraulic circuit includes a cylindrical valve 290 which is reciprocably mounted in a cylindrical bore 291 and has annular recesses 292 and 293 providing lands 294, 295 and 296. The valve bore 291 has annular grooves 297, 298, 299, 300, and 301. This valve assists in the control of the feed speed pistons 167 and 168 and is shifted when the direction of table movement is reversed so as to select the other feed speed piston.

In the lower portion of the drawing, there is illustrated a tank 310 containing a supply 311 of fluid, such as oil. A suction line 312 which includes a strainer 313 extends from the tank 310 to the intake of the make-up pump 70. The output of the pump 70 passes through a conduit 314 to the relief valve 73. Any fluid passing the relief valve is arranged to return to the tank 310 through a conduit 315. A conduit 316 extends from the conduit 314 to the check valve 71 and any fluid which passes the check valve flows through a conduit 317 into the annular passage 57 so as to replenish any fluid leaking from passage 57, its connecting passages 55 and 56, and pump and motor valve chambers and other portions of the circuit connected thereto. A branch conduit 318 extends from the conduit 316 to the check valve 72 and any fluid which passes said check valve flows through a conduit 319 to the valve chamber 43 and functions to replenish any oil which has leaked therefrom. The check valves 71 and 72 are arranged to prevent reverse flow therethrough when the conduits 317 and 319 receive high pressure fluid from the pump P.

The check valves function alternately to pass fluid when the pump-motor passage to which they are connected is operating as a return passage from the motor to the pump. Fluid from the make-up pump is also conducted from the conduit 316 through a conduit 320 to the annular groove 213 in the valve bore 201. Since recess 209 is in all positions of the valve in registry with groove 213, port 207 is at all times supplied with control fluid at 150 pounds pressure. Control fluid is also supplied from conduit 320 by means of a conduit 321 to the valve bore 277, a branch conduit 322 conducting fluid from the conduit 321 to the valve bore 278.

Fluid from the pump-motor circuit is also conducted to the valve 200. Thus a conduit 323 extends from the annular portion 56 of the pump-motor passage 55 to the high pressure relief valve 61. Any fluid passing the relief valve flows through a conduit 324 back to the valve chamber 43, the relief valve 61 functioning when the passage 55 operates as a supply passage from the pump to the motor. A conduit 325 connects with the conduit 323 and extends to the annular groove 218 in the valve bore 201. A conduit 326 connects with the conduit 324 and extends to the groove 217 in the valve bore 201. A conduit 327 connects the conduit 326 to the high pressure relief valve 60 and a conduit 328 connects the low side of the relief valve 60 with the conduit 325. It will be understood that the conduits 323 and 324 carry fluid alternately at 150 pounds pressure and the high working pressure (1000 pounds or more) depending upon the direction of flow from the pump P. When the valve 200 is in its neutral position, as illustrated in Fig. 1, the annular grooves 217 and 218 are connected together by an annular recess 219 in valve 200 to establish communication between the inlet and outlet passages of the pump P. As best seen in that figure, the recess 219 bridges only a portion of the grooves 217 and 218, thus providing a restricted interconnection utilized primarily to permit adjustment of the table by hand.

The piston and cylinder device 95, 96 for shifting the element 85 of the gearing 80 is arranged to receive low pressure control fluid from the valve bore 201. Thus a conduit 329 connects at one end to the right hand end of the cylinder 96 and at its other end to the annular groove 215 in the valve bore 201. A conduit 330 connects at one end with the left hand end of the cylinder 96 and at its other end with the annular groove 299 in the valve bore 291. A branch conduit 331 connects with the conduit 330 and with the annular groove 216 in the valve bore 201.

The connections from the valve 200 to the reversing pistons 141 and 147 and the feed control pistons 167 and 168 include a conduit 333 extending from the groove 211 in the valve bore 201 to the left hand end of the cylinders 165 and 166 in which the feed control pistons are located. A conduit 334 extends from the groove 212 in the valve bore 201 to the upper end of the valve bore 291 and a branch conduit 335 from the conduit 334 communicates with the left hand end of the cylinder 142. A conduit 336 extends from the groove 214 in the valve bore 201 to the lower end of the valve bore 291, and a branch conduit 337 connects the conduit 336 with the left hand end of the cylinder 146. The chamber 287 serves as a return passage for fluid and is connected by means of a conduit 338 to the tank 310. A conduit 339 connects the right hand end of the cylinder 165 with the groove 298 in the valve bore 291. A conduit 340 connects the right hand end of the cylinder 166 with the groove 300 in the valve bore 291. A conduit 341 connects the groove 297 of the valve bore 291 with the tank 310, and a conduit 342 connects the groove 301 of said valve bore with the conduit 341.

As mentioned hereinbefore, a conduit 321 together with a branch conduit 322 conducts control fluid to the valve bores 277 and 278 of the reversing valves 275 and 276. The chamber 281 into which the inner ends of the valves 275 and 276 discharge is connected to the tank 310 through intermediate conduit 350, chamber 351, and a conduit 352. A conduit 354 connects the groove 285 of the valve bore 277 to the groove 265 of the piston bore 255. A conduit 355 connects the groove 286 of the valve bore 277 with the left hand end of the cylinder bore 255. A conduit 356 connects the groove 285 of the valve bore 278 with the groove 266 in the piston bore 255. A conduit 357 connects the groove 286 in the valve bore 278 with the right hand end of the cylinder bore 255.

At 360 is indicated a milling machine table carrying a plurality of dogs FR, FR', RR, N, N', FL, FL' and RL arranged to engage and actuate the arm 229, and through the intervening connections, the valve 200. The table 360 also carries reversing or end dogs E and E' arranged to engage and depress the valves 275 and 276, respectively, to effect a reversal of the table movement. The dogs FR and FL may be referred to as feed dogs since they are effective to move the control valve 200 from traverse positions into feed positions. Likewise the dogs RR and RL may be referred to as rapid traverse dogs since they are effective to move the valve 200 from feed positions to rapid traverse positions. The dot-dash lines adjacent the arm 229 and valve 200 indicate the five positions to and between which these parts can be moved as R Left, F Left, Neutral, F Right and R Right, the letters F and R being abbreviations of the words "feed" and "rapid traverse" respectively, and the words "left" and "right" having reference to the direction of movement of the table 360. Preferably, the dogs N and N' are backed by springs 361 and 362 which hold the dogs in the positions shown for automatically actuating the arm 229, but which yield when the arm 229 is actuated by the manual control handle to permit the operator to move the valve 200 out of its neutral position.

The table 360, as shown, has depending end brackets 365 and 366 suitably bolted thereto. A feed screw 367 is rotatably mounted in these brackets and has squared ends 368 enabling it to be rotated manually for "set up" adjustments. The screw 367 is driven from the shaft 84 by suitable gearing (not shown) and operates in well known manner to drive the table.

With the construction thus far described, any one of the conventional cycles of table movement is obtainable. Such cycles include change from rapid traverse to feed, reversal and stopping. Each of the operations mentioned involves deceleration of the table and it is a feature of this invention to provide a construction for bringing about such operations quickly, smoothly and with a minimum of stress in the parts. Furthermore, a condition created in the mechanism as an incident to such deceleration is employed to adjust the mechanism better to effect such change in rate, reversal or stopping.

Generally speaking, means is provided to employ the full mechanical torque of the motor for braking during any deceleration of the table, and preferably also during initial movement especially following reversal. In a mechanism of the kind disclosed having a closed pump-motor circuit, deceleration of the table, when stopping, reversing or changing to feed rate, sets up a high back pressure, in the present instance, of the order of 1200 pounds per square inch. This back pressure in conjunction with the piston 144 is herein utilized to shift the wobbler device 39 of the motor to maximum stroke and thus obtain the full mechanical advantage of the motor and hence during the period of high pressure the full motor torque.

To that end, the piston and cylinder device 144, 145 is connected to the pump-motor circuit in a manner and through means such that it is normally subject to make-up or control fluid pressure and during deceleration to back pressure. Accordingly, a conduit 370 is connected at one end to the left end of the cylinder 145 and at its other end communicates with the central groove 371 in a valve bore 372. The bore 372 has additional grooves 373 and 374 on opposite sides of the central groove which are connected by conduits 375 and 376, respectively, with conduits 325 and 326 of the pump-motor circuit. Reciprocable in the bore 372 is a cylindrical valve 377 having a reduced portion 378 centrally thereof of a length bridging the central groove 371 and one of the end grooves 373 or 374 to connect cylinder 145 alternately to the conduits 325 and 326. The valve 377 is shifted hydraulically under the control of the main valve 200, an extension 334' of conduit 334 communicating with the lower end of bore 372, and an extension 336' of conduit 336 communicating with the upper end of bore 372. Cylinder 145 will thus always be connected to the return side of the pump-motor circuit.

Interposed in the conduit 370 is a check valve 379 yieldably held on an annular valve seat formed by the end of a bushing 380 by a light compression spring 381. The valve is disposed to permit free flow into the cylinder 145 but to prevent flow therefrom. Around the valve, however, is a bleed passage, herein taking the form of a small groove or aperture 382 in the valve seat. Thus the fluid flowing into the cylinder 145 under the high back pressure and shifting the piston 144 to the right to change the motor to maximum stroke is temporarily trapped by the check valve until it leaks out through the bleed passage. This temporary trapping is particularly advantageous for effecting reversal of the table, as will presently be shown in greater particularity.

The operation of the mechanism will now be described with particular reference to the functioning of the means producing maximum stroke and hence mechanical advantage of the motor during certain phases of the operation. Let it be assumed for this purpose that the motor 34 is running, that the main valve 200 is in its neutral position, and that the table 360, likewise, is in its neutral position. Under those conditions, the make-up pump 70 will be supplying make-up fluid to the closed pump-motor circuit and to the control circuit. Inasmuch as the cylinder 145 is always connected to the return side of the closed pump motor circuit, the piston 144 therein will now be subjected to make-up pressure, and thus will be shifted to the right, as shown in Fig. 1, causing the control plunger 158 to shift the pistons 141 and 147 to the position shown in Fig. 1, which is the no-stroke position of the pump P. Such shift of the pistons 141 and 147 to a position corresponding to the no-stroke position of the pump P is possible because their respective cylinders 142 and 146 are now connected to tank (conduits 335 and 334, groove 212, recess 204 and port 202, and conduit 336, groove 214, recess 205 and port 202). The understanding of the operation will be facilitated if it is borne in mind that, as previously stated, the cylinder 145 is always subject to the pressure in the return side of the closed pump-motor circuit and that the piston 144 opposes the action of the pistons 141 and 147 which have a somewhat larger pressure area and which are subjected either to no pressure or to control fluid pressure, which is the same as the make-up pressure.

Figure 4:
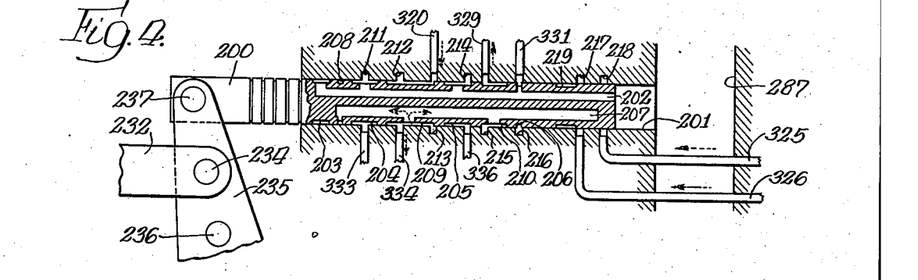
Fig. 4 is an enlarged view of the main control valve in rapid right position.

If it is assumed that the operator of the machine tool shifts the valve 200 from its neutral to its rapid right position for example, the following operations will take place: Control fluid will be supplied to the cylinder 142, to the top of the valve bore 291, and to the bottom of the valve bore 372, since the groove 212 is now connected through the recess 209 to port 207 of the valve 200. As a result, the valve 377 will be shifted to its upper position so as to connect the cylinder 145 to the return side of the pump-motor circuit. However, shift of valve 377 in this instance has no effect on piston 144 since the piston is subjected to the same pressure as before, namely makeup pressure which is pressure on both sides of the pump-motor circuit when the valve 200 is in neutral position. Likewise, the valve 290 will be shifted downwardly, but this also will have no effect under the present circumstances except to connect the right hand ends of the cylinders 165 and 166 to tank through different passages, that is, 165 will be connected through port 179, conduit 339, groove 298, recess 292, groove 299, conduit 330, branch 331, groove 216 (see Fig. 4), and port 202 to tank, while 166 will be connected through port 180, conduit 340, groove 300, recess 293, groove 301, branch 342 and return 341 to tank. The control fluid supply to the cylinder 142, however, since it is acting on a larger pressure area than that provided by the piston 144, will tend to move piston 142 to the right carrying with it the control plunger 158 and through the lever 159 tending to shift the piston 144 to the left. These movements, however, will be retarded because of the check valve 379, and may take place only at the rate at which the fluid from the cylinder 145 can escape through the bleed passage around the check valve formed by the groove 382. As a result, movement of the table is initiated with the motor at maximum stroke, and thus the full torque of the motor is obtainable to accelerate the table from zero to its rapid traverse rate. As the fluid leaks out through the bleed passage 382, the piston 144 will shift to the left and the piston 141 will shift to the right, causing the motor and the pump to assume minimum and maximum strokes, respectively, so as to drive the table at rapid traverse rate. Chambers and passages 48, 43, 53 now are part of the high pressure side of the circuit and 49, 54, 57, 55 and 56 part of the low pressure side.

Figure 3:
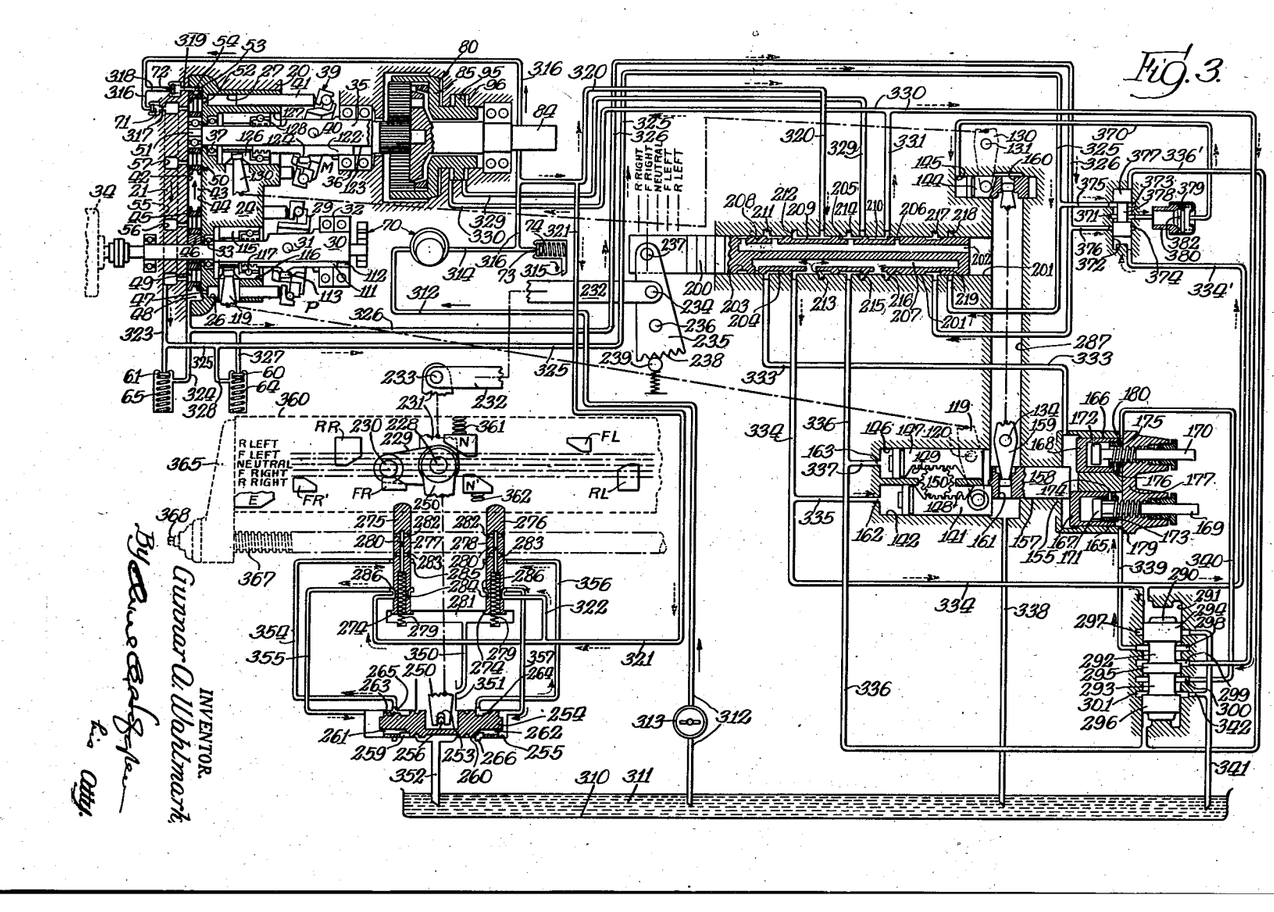
Fig. 3 is a circuit diagram similar to Fig. 1, but showing the parts in the positions assumed when the main control valve is in feed right position.

If now the feed right dog FR strikes the plunger 230 to shift the valve 200 to its feed right position, the mechanism will operate automatically to again shift the motor to maximum stroke in order that the full mechanical advantage of the motor may be utilized in smoothly and rapidly reducing the speed of the table to the desired feed rate. With the valve 200 in its feed right position (Fig. 3), the groove 216 is connected to receive control fluid from port 207 through recess 210 and thus control fluid will be supplied through the conduits 331 and 330, groove 299, recess 292, groove 298, and conduit 339 to the right end of the cylinder 165. The piston 167 will thereupon come to the aid of the piston 144 and shift the control plunger 158 to the left, which in turn will shift the piston 141 to the left to reduce the displacement of the pump P and increase the displacement of the motor M. With such reduction in displacement of the pump P and the tendency of the table to continue its movement at a rapid rate, the table 360 will drive the motor M as a pump and, as a consequence, a high back pressure will be built up in the return side of the pump-motor circuit, that is, in 57, 55 and 56 the only line of escape being past valve 61 which is adjusted to maintain high pressures. This back pressure will be transmitted through the check valve to the cylinder 145 and, because of its high value, will shift the piston 144 to the right to the limit of its movement, thereby tilting the wobbler 39 of the motor to maximum stroke position and, through the connected mechanism previously described, tilting the wobbler 29 of the pump to no-stroke position. The resistance of the valve 61 to the discharge of fluid, except at high pressure, coupled with the full mechanical advantage of the motor acting as a pump is thus available for decelerating the table. Aiding in this deceleration is the shift in the gearing 80, fluid now being supplied through conduits 331 and 330 to the left end of cylinder 96. As the speed of the table is reduced, the back pressure created is, likewise, reduced until the pressure in the return side of the pump-motor circuit is make-up pressure, at which time the piston 141, which is still supplied with fluid from port 207 through recess 209, groove 212, and conduits 334 and 335, overcomes the piston 144 and shifts the control plunger 158 to the right until it strikes the piston 167. The pump and the motor will then operate at such partial strokes as determined by adjustment of the screw 169.

Figure 5:
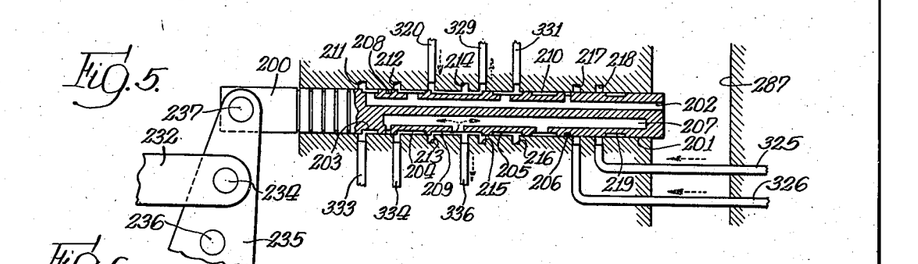
Fig. 5 is a view similar to Fig. 4 but showing the valve in rapid left position.
Figure 6:
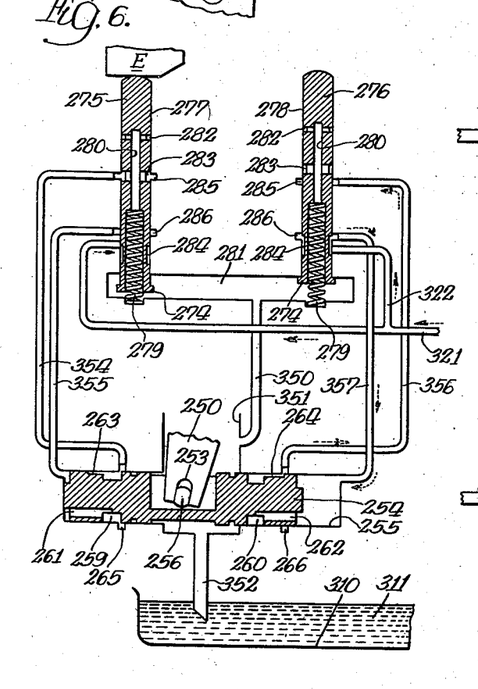
Fig. 6 is an enlarged view of the reversing mechanism depicted just after it has effected a reversal of the main control valve from rapid right to rapid left position.
Figure 7:
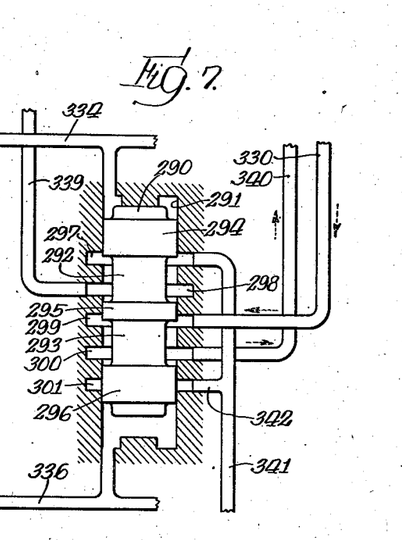
Fig. 7 is an enlarged view of the feed speed piston selection valve in the same position in which it is shown in Fig. 1.

At such time as a reversing dog E or E' actuates one of the reversing plunger valves 275 or 276, whether the table is moving at feed rate or at rapid traverse rate, the motor will again be shifted to maximum stroke so that the full mechanical advantage of the motor is available for first braking the table to bring the same to a rapid stop, and then for accelerating the table in the opposite direction. It is particularly in connection with such reversal that this invention is most important, in that it accomplishes a very rapid reversal which nevertheless is smooth and without shock, and without the excessive strain on certain parts which would take place were the reversal to be made with the motor at minimum stroke. With depression of the reversing plunger valve 275, for example, the main valve 200 will be shifted through neutral to rapid traverse rate in the opposite direction. This takes place as follows: Depression of the plunger valve 275 to the position shown in Fig. 6 first acts to close the groove 286 and thereby cut it off from the fluid supply in conduit 321. The fluid supply is thus cut off from the left hand end of cylinder 255 but, since the groove 286 is closed by valve 275, the fluid in the left hand end of cylinder 255 must exhaust through valve port 261, recess 259, longitudinal recess 263, groove 265, conduit 354, groove 285, recess 283 of valve 275 which now is in registry with groove 285, longitudinal port 280, chamber 281, conduit 350, chamber 351 and conduit 352 to tank. Since the valve 275 is generally operated by the end dog E when the table 360 is moving at a slow or feed rate of speed, the valve 275 moves downwardly rather slowly. In order to insure a shift of valve 200 through its neutral and left feed positions and all the way to its rapid traverse left position, means is provided for slowing down or retarding the movement of the piston 254 until the recess 283 in valve 275 has overlapped considerably the groove 285, and then shifting the piston 254 (and thereby the valve 200) quickly and fully to its rapid traverse left position. This means herein comprises the restricted recess 263 which serves to restrict the exhaust of fluid from the left end of cylinder 255 as it flows through port 261, recess 259, groove 265, recess 263, and conduit 354. By the time the piston 254 has moved sufficiently to the left to connect recess 259 directly to groove 265, the valve 275 has moved downwardly to open wide the groove 285 to the valve recess 283, whereupon further exhaust of the fluid from the left end of cylinder 255 is unrestricted and the piston 254 urged by the fluid under pressure in the right end of cylinder 255 shifts with a quick or snap action to its extreme left position, thereby moving valve 200 to its rapid traverse left position "R left" (see Fig. 5). With movement of the table to the left, the dog E rides off of the plunger valve 275 permitting the same to return to normal extended position, thereby again causing the piston 254 to be restored to hydraulic balance.

This shift of the piston 254 is, as just described at first gradual and then rapid. While the valve 200 is being shifted from one to the other side of neutral position, and before the fluid controlled thereby has had an opportunity to reverse the operation of the pump, the motor will, of course, be driven by the table. A high back pressure will, therefore, be built up in the return side of the pump-motor circuit as above pointed out and will, through the conduit 375, groove 373, recess 378, groove 371, the check valve, and the conduit 370, be transmitted to the end of the cylinder 145. This high pressure acting on the piston 144 will shift the same to the right, thereby returning the motor to maximum stroke and the pump to its minimum stroke position. Thus again the resistance of valves 60 or 61, coupled with the full mechanical advantage of the motor, will bring about rapid deceleration of the table. With the valve 200 now in rapid left position, control fluid will be supplied to the cylinder 146 through recess 209, groove 214 and conduit 336. Control fluid will, likewise, be supplied to the bottom end of the valve bore 291 and to the top end of the valve bore 372, causing the valve cores to be shifted to the positions shown in Fig. 1. Shift of the valve core 290 has no influence save to connect the cylinders 165 and 166 of the feed rate determining means to tank through circuits reversed from what they were with the valve in rapid right position. Shift of the valve 377, however, connects the cylinder 145 to the other side of the pump-motor circuit which now has become the return side.

Though the valve 200 is promptly shifted to its rapid left position, the wobblers of the pump and motor are not immediately shifted to the positions assumed during normal rapid traverse rate of operation. The fluid supplied to the end of cylinder 146 tends to urge piston 147 to the right to shift the control element 158 and piston 144 in a direction to increase pump displacement and decrease motor displacement. However, shift of the piston 144 to the left can take place only as rapidly as the fluid from the cylinder 145 can leak past the check valve through the bleed passage extending therearound. Thus, the result is that not only is the motor shifted to maximum stroke to obtain the benefit of full motor stroke in decelerating the table, but it is retained in that position long enough to permit such full motor stroke to be utilized in the initial acceleration of the table in its reversed direction of movement. As the fluid leaks around the check valve through the bleed passage provided for that purpose, the pressure on the cylinder 147 gradually shifts the control element 158 to the right and restores the transmission to operate at rapid traverse rate, that is, with the pump having maximum displacement and the motor minimum displacement. It might be mentioned in passing that with each shift of the valve 200 to feed position the planetary gearing is shifted to cause the same to operate to reduce the speed of the shaft 84 with respect to the motor shaft 35, while, when the valve 200 is shifted to either traverse position the planetary gearing is shifted to operate as a unit, causing shaft 84 to rotate at the same speed as the shaft 35 of the motor. This is accomplished as follows: When the valve 200 is in feed right position (Fig. 3) fluid is supplied to the left end of cylinder 96 from pressure port 207 through recess 210, groove 216, conduits 331 and 330, and is exhausted from the right end of cylinder 96 through conduit 329, groove 215 and recess 205 to the exhaust port 202. When the valve 200 is in its rapid right position, shown in Fig. 4, fluid under pressure would be supplied to the right end of the cylinder 96 and exhausted from the left end to shift the piston 95 and its associated mechanism to the left for unitary operation of the shafts 35 and 84. The fluid connections would now be from the pressure port 207, recess 210, groove 215 and conduit 329 with the return fluid from the left end of the piston discharging through conduits 330 and 331, groove 216, and recess 206 to the exhaust port 202. In the rapid left position (Fig. 5) of the valve 200, fluid under pressure will still be supplied to the right hand end of cylinder 96 through conduit 329. It will, however, now be connected to the pressure port 207 through the recess 209 instead of the recess 210, and groove 216 to which conduit 331 is connected will now register with recess 205 which is in communication with exhaust port 202. In the feed left position of the valve 200, pressure fluid will again be supplied to the left end of the cylinder 96 from pressure port 207 through recess 219 and conduit 331 the same as in the feed right position and will be exhausted from the right end of cylinder 96 through conduit 329, groove 215 and recess 205 in registry therewith and communicating with the exhaust port 202.

With the valve 200 shifted to neutral position to bring the table to a stop, substantially the same operation takes place as in connection with a shift from rapid traverse to feed. Suffice it to say, therefore, that the table driving the motor M during deceleration causes a high back pressure to be built up which, as previously described, shifts the piston 144 to the right to condition the motor for maximum stroke and the pump for minimum stroke. As the table comes to rest, the high back pressure reduces and eventually reaches normal pressure, which is make-up pressure. Because the valve 200 is now in neutral position, no fluid is supplied to either the cylinder 142 or 146, thus enabling even the make-up or control pressure acting on the piston 144 to retain the same in its extremely right position, conditioning the transmission for initial operation at full motor stroke when the valve 200 is again shifted to other than neutral position.

There has been described the operation for a simple cycle including rapid traverse, feed, reverse, rapid return and stop. This cycle has been described as starting to the right and hence involved the feed right dog FR and the reversing dog E. The same cycle to the left would involve the feed left dog FL and the reversing dog E' functioning in the same manner as the dogs FR and E, except, of course, that the dog E' would act on the plunger valve 276 and thus would cause a shift of the valve 254 in a direction opposite from that caused by depression of the plunger valve 275. Should it be desired, a cycle might be obtained containing a second traverse operation followed by another feed operation. For obtaining the second traverse operation the dogs RR and RL are provided. They function simply to engage the roller 230 and shift valve 200 to its rapid right or rapid left position, respectively, from a feed right or feed left position. For obtaining the second feed operation, the dogs FR' and FL' are provided. They function simply to engage the roller 230 and shift the valve to its feed right or feed left position, respectively, from the rapid right and rapid left positions.

I claim as my invention:

1. A machine tool having, in combination, a base, a support movably mounted on said base, and mechanism for driving said support comprising a motor, means for varying the mechanical advantage of said motor, means for decelerating said support, and means operable during such deceleration and in response to forces set up by the inertia of said support to increase the mechanical advantage of the motor.

2. A machine tool having, in combination, a base, a support movably mounted on said base, and mechanism for driving said support comprising a variable mechanical advantage motor, means for decelerating said support, and means operable during such deceleration and in response to forces set up by the inertia of said support to increase the mechanical advantage of the motor.

3. A machine tool having, in combination, a base, a support movably mounted on said base, and mechanism for driving said support comprising a variable stroke piston type motor, a pump supplying operating fluid to said motor, a closed hydraulic circuit connecting said pump and motor, means controlling the supply of fluid to said motor to effect deceleration of said support, such deceleration creating a back pressure in the closed circuit, and means responsive to such back pressure increasing the stroke of said motor pistons.

4. A machine tool having, in combination, a base, a support movably mounted on said base, and mechanism for driving said support comprising a variable stroke piston type motor, a pump supplying operating fluid to said motor, a closed hydraulic circuit connecting said pump and motor, means controlling the supply of fluid to said motor to effect deceleration of said support, such deceleration creating a back pressure in the closed circuit, and a piston and cylinder device exercising control over the stroke of said motor connected to the return side of said closed hydraulic circuit and operable in response to such back pressure to increase the stroke of said motor pistons.

5. A machine tool having, in combination, a base, a support movably mounted on said base, and mechanism for driving said support comprising a variable stroke piston type motor, a pump supplying operating fluid to said motor, a closed hydraulic circuit connecting said pump and motor, means controlling the supply of fluid to said motor to effect deceleration of said support, such deceleration creating a back pressure in the closed circuit, a piston and cylinder device exercising control over the stroke of said motor connected to the return side of said closed hydraulic circuit and operable in response to such back pressure to increase the stroke of said motor pistons, a check valve in the connection between said piston and cylinder device and said closed circuit permitting free flow into the device but preventing flow out of the device, and a bleed passage around the check valve.

6. A machine tool having, in combination, a base, a support movably mounted on said base, and mechanism for driving said support comprising a variable stroke piston type motor, a variable stroke piston type main pump, a closed hydraulic circuit connecting said pump and motor, an auxiliary pump supplying control fluid and make-up fluid to said closed circuit, a first piston and cylinder device governing displacement of said main pump, a second piston and cylinder device governing displacement of said motor, means interconnecting said devices to place the pump at no stroke when said motor is at maximum stroke, and a control fluid circuit including a valve means, said first piston and cylinder device being connected to said control fluid circuit to be governed by said valve and said second piston and cylinder device being connected to the return side of said closed circuit to be actuated by the fluid therein to increase motor displacement, the piston of said second device having a smaller pressure area than the piston of said first device.

7. A machine tool having, in combination, a base, a support movably mounted on said base, and mechanism for driving said support comprising a variable stroke piston type motor, a variable stroke piston type main pump, a closed hydraulic circuit connecting said pump and motor, an auxiliary pump supplying control fluid and make-up fluid to said closed circuit, a first piston and cylinder device governing displacement of said main pump, a second piston and cylinder device governing displacement of said motor, means interconnecting said devices to place the pump at no stroke when said motor is at maximum stroke, a control fluid circuit including a valve means, said first piston and cylinder device being connected to said control fluid circuit to be governed by said valve and said second piston and cylinder device being connected to the return side of said closed circuit to be actuated by the fluid therein to increase motor displacement, the piston of said second device having a smaller pressure area than the piston of said first device, a check valve in the connection between said piston and cylinder device and said closed circuit permitting free flow into the device but preventing flow out of the device, and a bleed passage around the check valve.

8. A machine tool having, in combination, a base, a support reciprocably mounted on said base, and mechanism for reciprocating said support comprising a motor having a variable mechanical advantage, means for reversing the direction of support movement, and means operable during such reversal and as an incident to forces set up by the inertia of said support to increase the mechanical advantage of said motor.

9. A machine tool having, in combination, a base, a support reciprocably mounted on said base, and mechanism for reciprocating said support comprising a variable stroke piston type motor, a pump supplying operating fluid to said motor, a closed hydraulic circuit connecting said pump and motor, means operable to reverse the direction of support movement, the deceleration of the support prior to reversal creating a back pressure in said closed circuit, and means responsive to such back pressure increasing the stroke of said motor pistons.

10. A machine tool having, in combination, a base, a support reciprocably mounted on said base, and mechanism for reciprocating said support comprising a variable stroke piston type motor, a pump supplying operating fluid to said motor, a closed hydraulic circuit connecting said pump and motor, means operable to reverse the direction of support movement, the deceleration of the support prior to reversal creating a back pressure in said closed circuit, means responsive to such back pressure increasing the stroke of said motor, and means operable after such increase of the stroke by back pressure to retard return of said motor to short stroke.

11. A machine tool having, in combination, a base, a support reciprocably mounted on said base, and mechanism for reciprocating said support comprising a variable stroke piston type motor, a pump supplying operating fluid to said motor, a closed hydraulic circuit connecting said pump and motor, means operable to reverse the direction of fluid flow to said motor, a piston and cylinder device governing the length of stroke of said motor pistons, a connection between said closed circuit and such end of said device that the fluid tends to increase the motor stroke including a valve operable alternatively to connect said device to one side or the other of said closed circuit, a check valve permitting free flow to said device but preventing flow from said device and a bleed passage around said check valve, and a control circuit including a valve governing the means for reversing flow to said motor and said first mentioned valve to maintain said device connected to the return side of said closed circuit.

12. A machine tool having, in combination, a base, a support reciprocably mounted on said base, and mechanism for reciprocating said support comprising a variable stroke piston type motor, a reversible flow variable displacement pump supplying operating fluid to said motor, a closed hydraulic circuit connecting said pump and motor, a piston and cylinder means operable to reverse the flow from said pump and render said pump operative to displace fluid, a piston and cylinder device governing the length of stroke of said motor pistons, a connection between said means and said device operable to decrease the stroke of said motor pistons as said pump displacement is increased and vice versa, a connection between said closed circuit and such end of said device that the fluid tends to increase the motor stroke including a valve operable alternatively to connect said device to one side or the other of said closed circuit, a check valve permitting free flow to said device but preventing flow from said device and a bleed passage around said check valve, and a control circuit including said piston and cylinder means, said first mentioned valve and a main control valve governing the flow of control fluid to said piston and cylinder means and to said first mentioned valve to maintain said piston and cylinder device connected to the return side of said closed circuit as the flow from said pump is reversed.

13. A machine tool having, in combination, a base, a support reciprocably mounted on said base, and mechanism for reciprocating said support comprising a variable stroke piston type motor, a reversible flow variable displacement pump supplying operating fluid to said motor, a closed hydraulic circuit connecting said pump and motor, a piston and cylinder means operable under pressure of fluid supplied thereto to reverse the flow from said pump and render said pump operative, a piston and cylinder device operable under pressure of fluid supplied thereto to increase the stroke of said motor pistons, a connection between said means and said device causing the same to oppose one another, the piston of said device having a smaller pressure area than a piston of said means, a connection between said closed circuit and such end of said device that the fluid tends to increase the motor stroke including a valve operable alternatively to connect said device to one side or the other of said closed circuit, a check valve permitting free flow to said device but preventing flow from said device and a bleed passage around said check valve, and a control circuit including said piston and cylinder means, said first mentioned valve, a pump supplying control fluid to said control circuit and make-up fluid to said closed pump-motor circuit, and a main control valve governing the flow of control fluid to said piston and cylinder means and to said first mentioned valve to maintain said piston and cylinder device connected to the return side of said closed circuit as the flow from said pump is reversed.

14. A machine tool having, in combination, a base, a support movably mounted on said base, and mechanism for driving said support at feed or traverse rates comprising a motor, means for varying the mechanical advantage of said motor, and means operable to condition said mechanism for initial operation at full mechanical advantage of said motor regardless of the mechanical advantage at which the means for varying the mechanical advantage is set.

15. A machine tool having, in combination, a base, a support movably mounted on said base, and mechanism for driving said support at feed or traverse rates comprising a motor, means for varying the mechanical advantage of said motor normally positioned to obtain full mechanical advantage, means retarding reduction in the mechanical advantage of the motor, and means operable upon initiation of driving operation of the mechanism to urge said first mentioned means to reduce the mechanical advantage of the motor.

16. A machine tool having, in combination, a base, a support movably mounted on said base, and mechanism for driving said support comprising a variable stroke piston motor of the wobbler type, a variable stroke piston pump of the wobbler type, a first piston and cylinder device associated with the wobbler of said motor and operable with the application of pressure fluid thereto to tilt the wobbler to maximum stroke position, a second piston and cylinder device associated with the wobbler of said pump and operable upon the application of pressure fluid thereto to tilt the wobbler to obtain maximum stroke of the pump, means interconnecting the pistons of said device to oppose movement of one another, means for supplying fluid under pressure to said devices, the supply to said first device being uninterrupted, means for retarding the discharge of fluid from said first device, and a valve governing the supply of pressure fluid to said second piston and cylinder device having a neutral position wherein the supply is cut off and the piston and cylinder device connected to tank and an operative position wherein fluid is supplied to said device, said second device under like fluid pressure overcoming said first device.

17. A machine tool having, in combination, a base, a support movably mounted on said base, and mechanism for driving said support comprising a variable stroke piston motor of the wobbler type, a variable stroke piston pump of the wobbler type, said pump and motor being connected in a closed hydraulic circuit, a first piston and cylinder device associated with the wobbler of said motor and operable when supplied with fluid under pressure to urge the wobbler to maximum stroke position, a second piston and cylinder device operatively associated with the wobbler of said pump and operable when supplied with fluid under pressure to urge the wobbler to maximum pump displacement position, means operatively interposed between said devices causing the pistons thereof to oppose one another, the piston of said second device being slightly larger than that of said first device, means connecting said first device to the return side of said pump-motor circuit including a check valve operable to permit flow into the device but to prevent flow therefrom, a bleed passage around said check valve, an auxiliary pump supplying make-up fluid to said closed pump-motor circuit, and control fluid to said second device, and a valve governing the supply of fluid to said second device having a neutral position in which said second device is connected to tank to permit said first device to position said motor and pump wobblers in maximum and minimum stroke positions respectively, and having an operative position wherein fluid is supplied to said second piston and cylinder device to initiate operation of the driving mechanism at maximum stroke of the motor.

18. A machine tool having, in combination, a base, a support movably mounted on said base, and mechanism for driving said support comprising a variable stroke piston motor of the wobbler type, a variable stroke piston pump of the wobbler type, said pump and motor being connected in a closed hydraulic circuit, a first piston and cylinder device associated with the wobbler of said motor and operable when supplied with fluid under pressure to urge the wobbler to maximum stroke position, a second and a third piston and cylinder device operatively associated with the wobbler of said pump with said second device operable to shift the wobbler to forward operation of the pump and said third device operable to shift the wobbler to reverse operation of the pump, means operatively interposed between said first device and said second and third devices to oppose the movements thereof, the piston of each said second and third device providing a larger pressure area than the piston of said first device, means connecting said first device to the closed pump-motor circuit including a hydraulically shifted valve alternately connecting said first device to one or the other side of said closed circuit, and a check valve permitting flow to said device but preventing flow therefrom, a bleed passage around said check valve, an auxiliary pump for supplying make-up fluid to said closed circuit and control fluid to said second and third devices, a valve governing the supply of control fluid to said second and third devices and to said hydraulically shifted valve having a neutral position in which no fluid is supplied to either said second or said third device, a position on one side of neutral for supplying fluid to said second device to effect forward operation of the pump and to said hydraulically shifted valve to position the same for connecting said first device to the then return side of said closed circuit, and a second position on the opposite side of neutral for supplying fluid to said third device to effect reverse operation of said pump and to the opposite end of said hydraulically actuated valve to cause the same to connect said first device to the other side of said closed circuit.

19. A machine tool having, in combination, a base, a support movably mounted on said base, and mechanism for driving said support at feed or traverse rates comprising a motor of the wobbler type, the motor wobbler being variously positionable to adjust the displacement of said motor for driving said support at feed or traverse rates, means normally positioning the motor wobbler to obtain full displacement, means limiting the position of the motor wobbler when adjusted for traverse operation, means limiting the position of the motor wobbler when adjusted for feed operation, said limiting means being selectively effective, means retarding adjustment of the motor wobbler to effect reduction in the displacement of the motor, and means operable upon initiation of the driving operation of the mechanism to urge said first mentioned means to position the motor wobbler in contact with the selected one of said limiting means.

GUNNAR A. WAHLMARK.